US010778472B2

(12) United States Patent
Li et al.

(10) Patent No.: US 10,778,472 B2
(45) Date of Patent: Sep. 15, 2020

(54) OPPORTUNISTIC MEASUREMENT AND FEEDBACK IN A WIRELESS LOCAL AREA NETWORK

(71) Applicant: Apple Inc., Cupertino, CA (US)

(72) Inventors: Guoqing Li, Campbell, CA (US); Joonsuk Kim, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 526 days.

(21) Appl. No.: 15/371,049

(22) Filed: Dec. 6, 2016

(65) Prior Publication Data
US 2017/0163446 A1 Jun. 8, 2017

Related U.S. Application Data

(60) Provisional application No. 62/264,719, filed on Dec. 8, 2015.

(51) Int. Cl.
H04W 72/04 (2009.01)
H04L 25/02 (2006.01)
H04B 17/318 (2015.01)
H04B 17/336 (2015.01)
H04W 72/08 (2009.01)
(Continued)

(52) U.S. Cl.
CPC ....... H04L 25/0202 (2013.01); H04B 17/318 (2015.01); H04B 17/336 (2015.01); H04L 25/0224 (2013.01); H04W 72/085 (2013.01); H04L 1/1685 (2013.01); H04L 1/20 (2013.01); H04W 84/12 (2013.01); H04W 88/02 (2013.01); H04W 88/08 (2013.01)

(58) Field of Classification Search
None
See application file for complete search history.

(56) References Cited

U.S. PATENT DOCUMENTS 8,089,947 B2 * 1/2012 Cordeiro ............... H04W 28/20
370/348
8,547,833 B2 * 10/2013 Garrett .................. H04B 17/21
370/229

(Continued)

OTHER PUBLICATIONS

Stacey, Robert; Specification Framework for TGax, IEEE P802.11, Wireless LANs; doc.: IEEE 802.11-15/0132r8; 22 pgs.; Sep. 22, 2015.

(Continued)

Primary Examiner — Willie J Daniel, Jr.
(74) Attorney, Agent, or Firm — Dickinson Wright RLLP

(57) ABSTRACT

Uplink resource assignment in a wireless local area network (WLAN) by an access point (AP) to wireless stations (STAs) is herein provided using opportunistic feedback from the STAs. The AP sends a message to a first STA; the message is also observed by a second STA. Each STA can determine if it wishes to opportunistically send information concerning the message to the AP. The second STA can perform power measurements on the message and send subcarrier signal to noise ratio (SNR) or ranking information to the AP. Thus, the AP can receive, possibly without expectation, encoded or compressed information describing radio channels of the first STA and/or the second STA. Based on the received channel information the AP improves operation of a dynamic resource allocation algorithm which determines uplink grants of resource units (RUs) to the STAs.

18 Claims, 12 Drawing Sheets

(51) Int. Cl.
  *H04W 84/12*   (2009.01)
  *H04W 88/08*   (2009.01)
  *H04W 88/02*   (2009.01)
  *H04L 1/20*    (2006.01)
  *H04L 1/16*    (2006.01)

(56) References Cited

U.S. PATENT DOCUMENTS

| | | | |
|---|---|---|---|
| 8,804,559 B2* | 8/2014 | Liu | H04L 1/0026 |
| | | | 370/252 |
| 2014/0029453 A1* | 1/2014 | Trainin | H04W 24/10 |
| | | | 370/252 |
| 2017/0093600 A1* | 3/2017 | Li | H04L 5/0037 |
| 2018/0063736 A1* | 3/2018 | Sadeghi | H04W 72/0446 |

OTHER PUBLICATIONS

LTE, Evolved Universal Terrestrial Radio Access (E-UTRA), Physical channels and modulation (3GPP TS 36.211 version 12.7.0 Release 12); ETSI TS 136 211 v12.7.0; ETSI; 138 pgs.: pp. 38-46 and 89-110; Oct. 2015.

LTE, Evolved Universal Terrestrial Radio Access (E-UTRA), Medium Access Control (MAC) protocol specification (3GPP TS 36.321 version 12.7.0 Release 12); ETSI TS 136 321 v12.7.0; ETSI; 79 pgs. pp. 31-33, 49-50 and 60-66; Oct. 2015.

Stacey, Robert; Specification Framework for TGax, IEEE P802.11, Wireless LANs; doc.: IEEE 80211-15/0132r10; 34 pgs.; Nov. 2015.

* cited by examiner

OPPORTUNISTIC MEASUREMENT AND FEEDBACK IN A WIRELESS LOCAL AREA NETWORK

PRIORITY APPLICATION

This application claims benefit of U.S. Provisional Patent Application No. 62/264,719 filed on Dec. 8, 2015 and entitled "OPPORTUNISTIC MEASUREMENT AND FEEDBACK IN A WIRELESS LOCAL AREA NETWORK," which is hereby incorporated by reference herein in its entirety.

FIELD

The described embodiments relate generally to multiple access wireless communications using electronic devices, including systems and techniques for opportunistically estimating wireless channel characteristics between an access point and a first wireless station, and between the access point and a second wireless station.

BACKGROUND

Institute of Electronic and Electrical Engineers (IEEE) standard 802.11ac provides an arrangement for channel estimation of uplink and downlink channels between an access point (AP) and multiple wireless stations (STAs). The channel estimation involves a process called sounding. To perform downlink sounding, an AP transmits a Null Data Packet-Announcement (NDP-A). The NDP-A contains the addresses of particular STAs to which the AP wishes to transmit data. The NDP-A is followed by a Null Data Packet (NDP). The NDP represents pilot energy; that is, a predefined pattern. Each STA addressed by the NDP-A measures the downlink wireless channel from the AP to itself. The channel measurement is possible because the given STA knows the pre-defined pattern and can estimate the effects of the channel on that pattern (for example, amplitude attenuation, carrier phase rotation, and time delay). Uplink sounding can be performed by instructing one or more STAs to send NDPs, which the AP then observes.

IEEE 802.11n specifies a high throughput (HT) physical layer and medium access control layer. IEEE 802.11ac specifies a very high throughput (VHT) physical layer and medium access control layer. More information can be found in IEEE P802.11 Wireless LANS, *Specification Framework for TGax*, Nov. 25, 2015, doc.: IEEE 802.11-15/0132r10.

For downlink channel measurements, various STAs feedback their channel measurements to an AP and an AP with multiple antennas can transmit multiple streams to the multiple STAs (each with multiple antennas) based on the received channel information.

Wireless Local Area Networks (WLANs) supporting uplink and downlink transmission between multiple STAs and APs rely on accurate channel information. An AP may have many STAs desiring service, with different radio channels to each STA due to unique scattering geometries between the AP and each STA. A conventional AP can allocate bandwidth of an uplink transmission to a STA that has a weak uplink channel to the AP. Other STAs will not be scheduled to transmit, and the overall system throughput is low.

SUMMARY

Representative embodiments set forth herein disclose various systems and techniques for opportunistically estimating wireless channel characteristics between an access point and a first wireless station, and between the access point and a second wireless station. Embodiments can be implemented to provide various advantages, including improving determination of uplink channel information from multiple STAs, which can provide for improved allocation of uplink radio resources by the AP.

WLAN systems include APs and STAs. The embodiments provided herein include providing observed downlink channel information from STAs to an AP. In configurations in which the AP can estimate the uplink channel based on the downlink channel (e.g., when a channel reciprocity property applies) the AP can improve uplink channel allocation based on the received observations of downlink channel transmission.

In order to efficiently allocate uplink resources to multiple STAs, an estimate of a joint uplink channel matrix H with submatrix components $H_1$ and $H_2$ is provided by embodiments of this disclosure. The AP can solicit observations from STAs or receive unsolicited channel information from STAs. The AP then applies an algorithm based on the channel information to determine which STAs should be allocated uplink resources in a given time interval. The STAs can provide different representations of channel information and the information can be sent flexibly in a number of different message types.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve to provide examples of possible structures and arrangements for the disclosed systems and techniques, e.g., for intelligently and efficiently managing calls and other communications between multiple associated user devices. These drawings in no way limit any changes in form and/or detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses, systems, and methods according to the presently described embodiments are provided in this section. These examples are being provided solely to add context and to aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In order to implement Multi-User, Multiple Input, Multiple Output (MU-MIMO) on an uplink, it is useful to determine channel information between a set of STAs that will transmit together (e.g., in the same time interval) to the AP. In some embodiments, to obtain multiple received streams with good signal to noise ratio at the receiver, the AP will compute transmission parameters based on a decomposition of a joint channel matrix H, where H represents uplink channel information from each STA scheduled to transmit in a same time interval. H can be estimated at the AP.

Particular aspects of the embodiments are now discussed with reference to the figures.

Communication System

Figure 1:
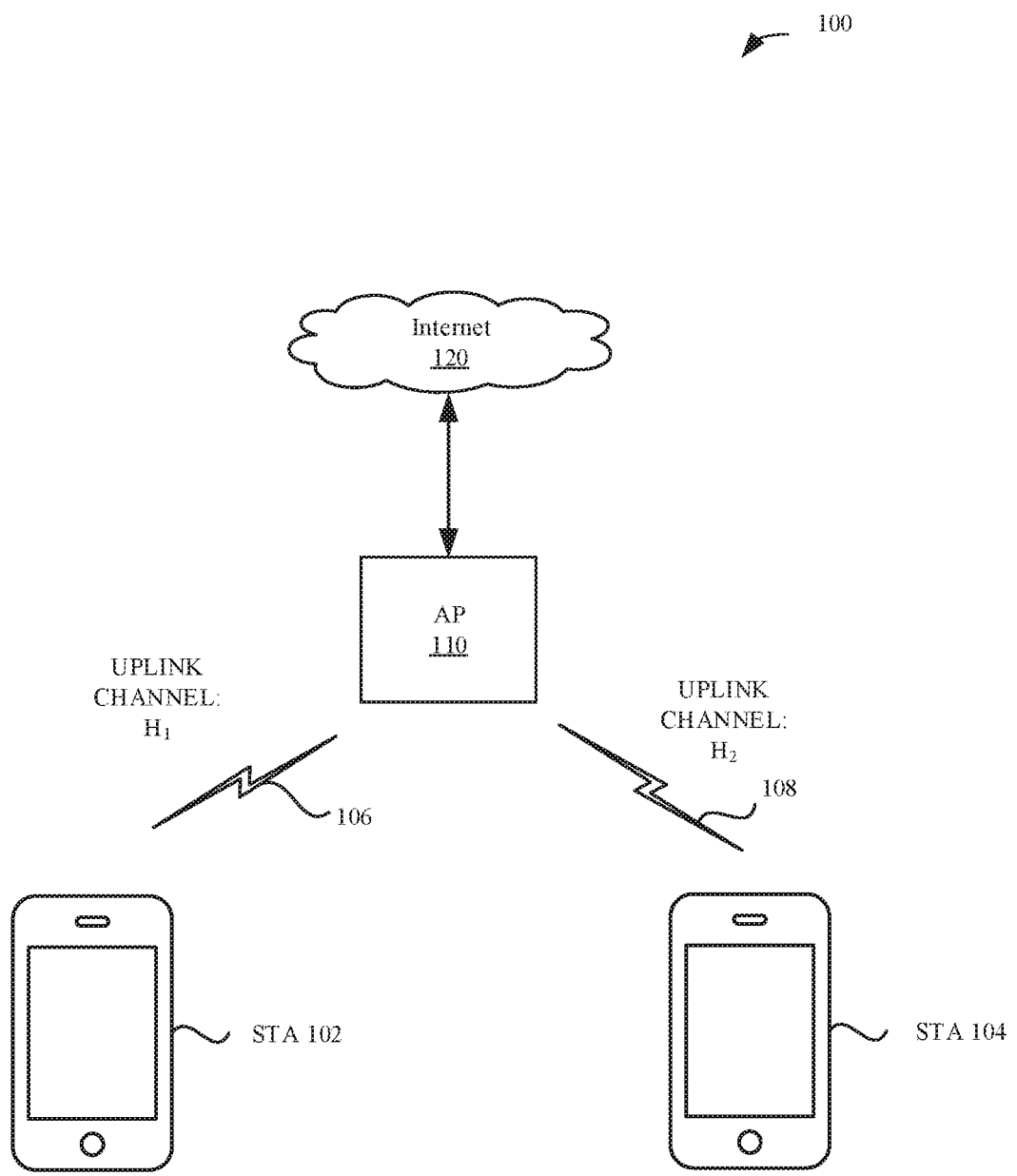
FIG. 1 illustrates an exemplary WLAN system including an AP and multiple STAs, according to some embodiments.

FIG. 1 illustrates an exemplary WLAN system including STA 102, STA 104, AP 110, and Internet 120. The wireless connection between STA 102 and AP 110 is indicated as link 106 and the connection between STA 104 and AP 110 is indicated as link 108. The direction or sense of these connections is described as follows. Transmission from AP 110 to the STAs is downlink transmission. Transmission from either STA to AP 110 is uplink transmission. In some embodiments, uplink and downlink transmissions use different frequency bands. In that case, the channel response on the downlink from AP 110 to STA 102, for example, may differ from the channel response on the uplink from STA 102 to AP 110, e.g., because of the different path lengths and/or signal characteristics. A channel response is based on the phenomenon of radio waveforms at the downlink or uplink frequency interacting with scatterers. When uplink and downlink frequencies differ, a given waveform at the uplink frequency can experience a different total carrier phase rotation accumulated in interacting with a set of scatterers than a waveform at the downlink frequency interacting with the same set of scatterers. Attenuation generally also is a function of frequency. In some embodiments, uplink and downlink transmissions use the same frequency band. When uplink and downlink transmissions are on the same band(s), the principle of channel reciprocity implies that the channel response on the downlink from AP 110 to STA 102, for example, should be the same as the channel response on the uplink from STA 102 to AP 110.

An OFDM system uses a plurality of subcarriers; let the number of subcarriers in an OFDM symbol be L. Generally the uplink channel from STA 102, $H_1$, is an L-vector formed of L complex scalars, each scalar representing a channel gain at the corresponding subcarrier. For some delay spread and subcarrier spacings of interest, $H_1$ changes slowly in response to frequency differences from element to element of $H_1$, and it is not necessary to perform a measurement at each subcarrier. For example, measurements can be made at subcarriers indexed with an even index value, and the values of $H_1$ corresponding to the odd indices can be estimated by interpolating between the values of $H_1$ at the even indices. AP 110 can also learn the uplink channel response, $H_2$, associated with link 108, e.g., by asking STA 104 to send an NDP data packet as described below. The joint matrix H may be written as H=[$H_1$ $H_2$] and an observation at one antenna of the AP may be written as y=H'[$x_1$' $x_2$']' (neglecting noise) where x is a transmit vector and z' is the Hermitian transpose of z. Many symbolic representations are possible. Let two antennas at the AP be labelled A and B. The two observations may be written $y_A$=$H_A$'[$x_1$' $x_2$']' and $y_B$=$H_B$'[$x_1$' $x_2$']'. In the two antenna-AP case, $H_1$, the uplink channel from STA 102 to AP 110, generalizes to $H_{1A}$ and $H_{1B}$. Expressions in terms of more than two antennas at the AP are straightforward. Particular details of OFDM modulation, such as subcarriers, will be touched on as needed in the explanations of the channel sounding techniques provided herein.

Dynamic Resource Allocation for Uplink

In some embodiments, AP 110 executes a dynamic resource allocation algorithm in order to maximize the total transfer of information on the uplink for multiple devices attempting to access a shared resource (the bandwidth available for transmission). In a bandwidth distribution solution of information theory known as water-filling, the multiple access channel reaches a high throughput when the channel users with the best channels devote the most energy to the channel. To identify which STAs have the best channels and thus should transmit the most bits in a given time, AP 110 needs to learn (or assess) the channel. When AP 110 has adequate information from STAs of interest, it can run its dynamic channel allocation algorithm and allocate multiple access resources, such as OFDM RUs to various STAs according to a configuration determined by the algorithm.

Uplink Channel Estimate, Opportunistic STA Feedback

Figure 2:
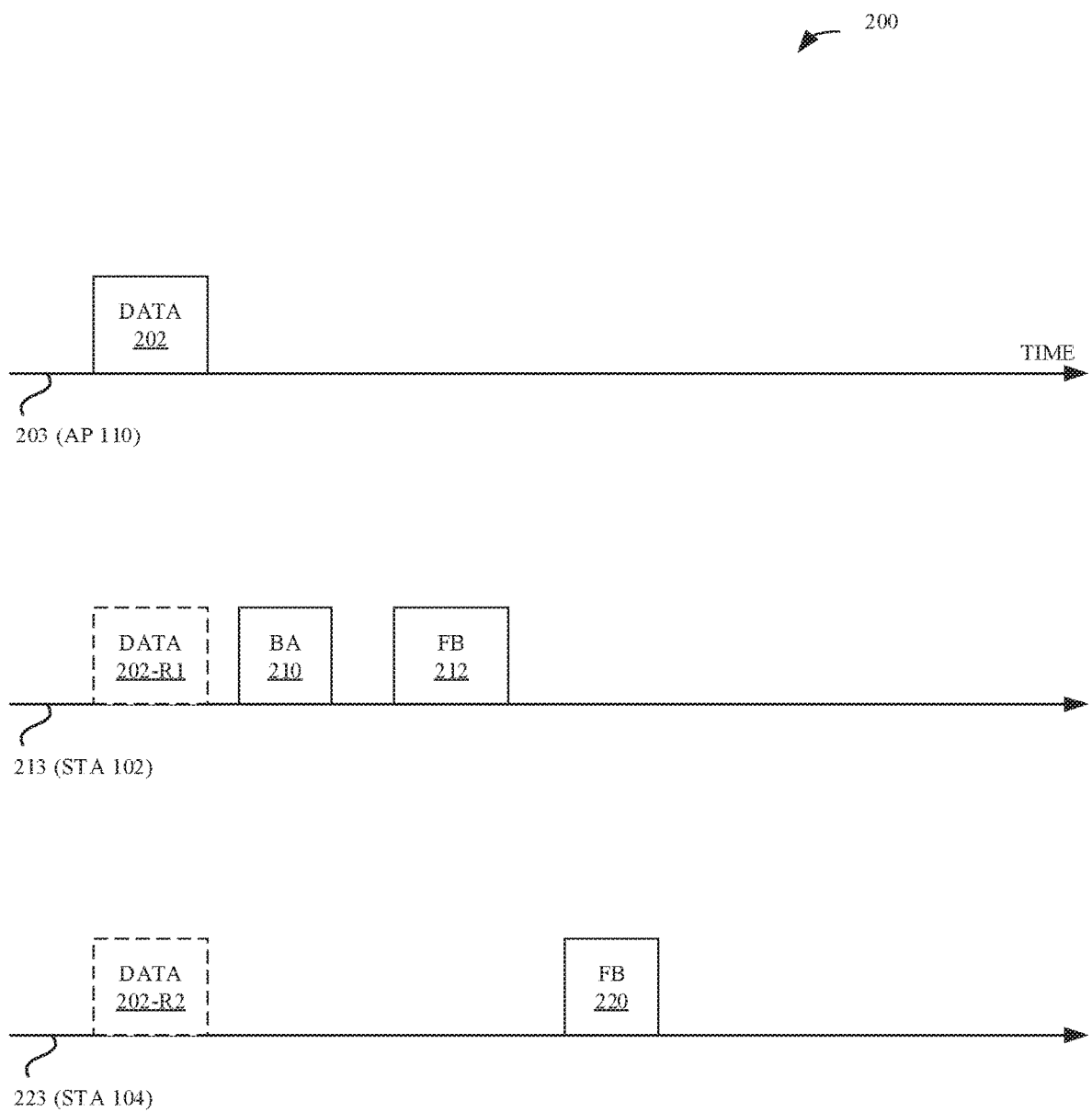
FIG. 2 illustrates an exemplary message sequence in which two STAs opportunistically provide feedback channel estimation, according to some embodiments.

FIG. 2 illustrates an exemplary message sequence that results in the AP 110 obtaining an estimate of the uplink channels $H_1$ and $H_2$. Three timelines (203, 213, and 223) are shown in FIG. 2, one for each of AP 110, STA 102 and STA 104 (indicated in parentheses in FIG. 2). The three timelines illustrate transmitted signals (for example, the variables $x_1$ and/or $x_2$ as explained with respect to FIG. 1); corresponding received versions of the transmitted signals (for example, the variable y as explained with respect to FIG. 1) are shown as data 202-R1 and data 202-R2. Generally, the received versions of signals are not shown in these figures. In FIG. 2, uplink channel information is collected in a time sequence. The first event occurs on timeline 203. AP 110 sends data 202 addressed to STA 102. STA 102 receives data 202 (indicated with dashed box data 202-R1) and responds by transmitting block acknowledgement BA 210. STA 102 also sends an estimate of downlink channel $H_1$ as feedback information FB 212. FB 212 can be a frame with a MAC header and MAC payload, or it can be, for example, a management frame. STA 102 creates FB 212 based on its observation of data 202. The channel information sent by STA 102 in FB 212 is encoded in some fashion. The channel information may be signal to noise ratio (SNR) information per subcarrier, received signal strength indication (RSSI) information for an entire modulated bandwidth, or, for example, a ranking of strongest subcarriers or RUs observed in data 202 by STAs 102 and/or 104.

The channel information may be extensive, such as per subcarrier or per RU. The value of each SNR value, for example, may be precise such as 8 bits, or may be quantized using a lower number of bits, such as 1, 2, 3, or 4 bits. The number of subcarriers or number of RUs represented may be extensive, such as approximately 256 subcarriers in 20 MHz or 9 RUs. Alternatively, the number of subcarriers (or RUs) represented may be a sampling, such as 10, 20 or 50 subcarriers in 20 MHz. In some embodiments, the channel information may include a ranking without intensity or power or signal to noise ratio information. For example, STA 102 may provide an indication of the strongest observed subcarrier or RU. In some embodiments, this indication is an index or address of the indicated subcarrier or RU. In some embodiments, STA 102 provides indications of a strongest N subcarriers or strongest M RUs. For example, M can be 3 indicating the strongest 3 RUs. N can be 4 indicating the strongest 4 subcarriers. In some embodiments, STA 102 provides a single global power measurement, such as an amount of power observed over a time interval in a certain bandwidth, for example, 20 MHz. This power measurement can be an RSSI value encoded with high resolution (for example 8 bits) or roughly quantized (for example: 1, 2, 3, or 4 bits).

In some embodiments, STA 102 provides channel information concerning, e.g., approximately one half of the RUs in a given bandwidth. For example, STA 102 can provide information about four or five RUs of nine RUs in a 20 MHz bandwidth. In some embodiments, STA 102 provides 3 or 4 bit SNR values for the highest quality observed RUs observed. The location or identity of the RUs for which information is provided by the STA can be identified using indices.

In some embodiments, STA 102 ranks 9 RUs observed in 20 MHz and sends the ordered list determined by the ranking to AP 110. Such a transmission could be realized using four bits per RU index for nine RUs, thus a maximum number of bits needed would be four times nine or 36 bits. Other encoding schemes could be used by STA 102 to indicate the ordered list to AP 110. The ranking and/or the RSSI information, in some embodiments, can be sent by STA 102 to AP 110.

After receiving the channel information, AP 110 can use it to decide which STA to schedule for a next uplink physical layer convergence protocol (PLCP) protocol data unit (PPDU) transmission opportunity and which RU or RUs should be allocated to that STA.

AP 110, in some embodiments, estimates uplink channel $H_1$ from STA 102 as being equal to the downlink channel from AP 110 to STA 102. This assumption is strong when AP 110 and STA 102 operate, for example, in a time division duplex (TDD) manner of some kind on a common frequency band; this may be referred to as the TDD assumption (see discussion of reciprocity above). In some embodiments, TDD does not impose a strict time slot structure. STA 104 may also observe data 202 and decide to opportunistically transmit a channel estimate to AP 110; STA 104's observation is indicated in FIG. 2 as a dashed box marked data 202-R2. STA 104 may obtain a downlink channel estimate based on known components (e.g., pre-determined bit or symbol values) of a header or preamble in the frame indicated as data 202 in FIG. 2. A channel estimate may also be referred to as a channel quality herein. In some embodiments, STA 104 produces channel information based on power observations and not intensity. In that case, STA 104 does not need knowledge of components of data 202. An example of such a data-value-insensitive measurement is RSSI. Thus, in FIG. 2, an exemplary transmission FB 220 from STA 104 provides AP 110 with information about the downlink channel from AP 110 to STA 104. AP 110 can estimate (e.g., under the TDD assumption) uplink channel $H_2$ from STA 104 as being equal to the downlink channel from AP 110 to STA 104. In FIG. 2, STAs 102 and 104 provided feedback information opportunistically. This information is useful and can also be used by AP 110 in its dynamic resource allocation algorithm to select which STAs should be granted uplink resources for a given time interval and the number of RUs to be granted to each selected STA.

Uplink Channel Estimate, Solicited STA Feedback

Figure 3:
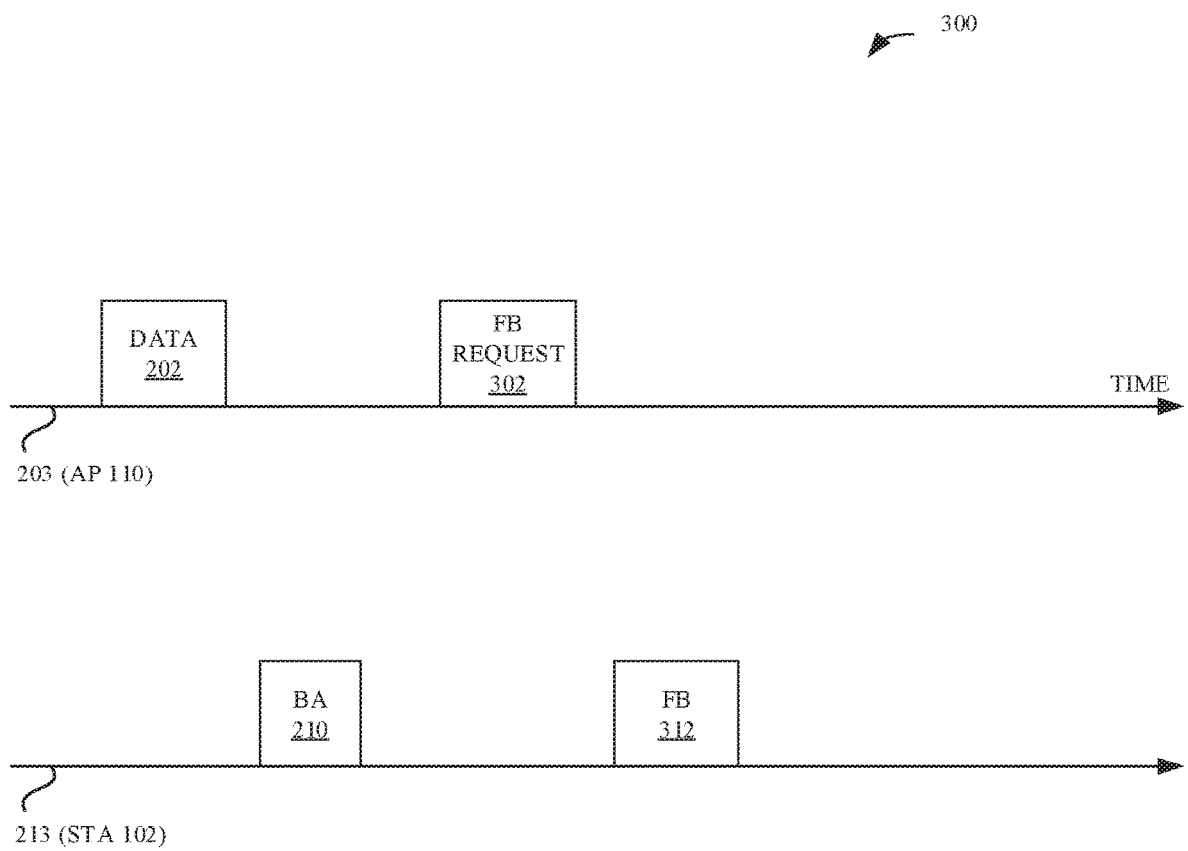
FIG. 3 illustrates an exemplary message sequence in which an AP requests a channel estimate from a STA, according to some embodiments.

Alternatively or additionally, in some embodiments, AP 110 can solicit STA feedback. FIG. 3 illustrates an exemplary implementation in which AP 110 sends channel estimate request (FB request) 302 after receiving the block acknowledgement BA 210. FB request 302 can be implemented with any desired fields, such as a feedback control field and an address field. Alternatively, STA options can be implied by a standard specification set of policies or rules; thus, an explicit feedback control field, in some embodiments, is not included in FB request 302. The feedback control field can be asserted (for example, set to "11" as an example feedback control field value) to indicate the feedback is required. The address field can be used to indicate a specific STA or a group of STAs, or can be omitted or unused for some values of the control field. In some embodiments, the feedback control field has a soft aspect, that is, the control field indicates that feedback is permitted, but not required (an exemplary value may be "10"). If the feedback control field is not asserted, this can indicate that feedback is discouraged (an exemplary value "01") or not permitted (an exemplary value "00"). AP 110 may send such a request under several scenarios. In some embodiments AP 110 can determine that more channel information about the uplink channel from STA 102 would improve its dynamic resource allocation algorithm. To obtain this information, it can request feedback from STA 102. STA 102, in some embodiments, evaluates the feedback control field to arrive at a reporting decision. When STA 102 arrives at a positive reporting decision and responds with an estimate of the downlink channel (this estimate is included in message FB 312), AP 110 can approximate the uplink channel as being equal to the downlink channel. STA 102, in some embodiments retains recent reporting decision outcomes in a reporting record.

In some scenarios, AP 110 serves many STAs and at some times has channel information with high confidence (low error variance on the channel estimates) for the STAs with active links. In this case, AP 110 may refrain from soliciting feedback, since the feedback event occupies a finite portion of the available channel bandwidth. In such a case, the feedback control field of FB request 302 may have value "00", and STA 102 would send BA 210 but not FB 312. In some embodiments, the feedback control field and address field can be sent in a header of data 202. In that case, in some embodiments, FB request 302 need not be sent and STA 102 will still receive the feedback control field and can act accordingly. STA 102, in some embodiments, can behave as follows: i) transmit FB 312 based on a corresponding request for feedback (e.g., feedback control field of data 202 having value "11"), ii) transmit FB 312 based on a field encouraging feedback (e.g., feedback control field "10"), iii) transmit FB 312 despite a field discouraging feedback (e.g., feedback control field "01"), iv) not transmit FB 312 based on a field prohibiting feedback (e.g., feedback control field "00") v) optionally not transmitting FB 312 based on the feedback control field value "10", or vi) optionally not transmitting FB 312 based on the feedback control field value "01."

Figure 4:
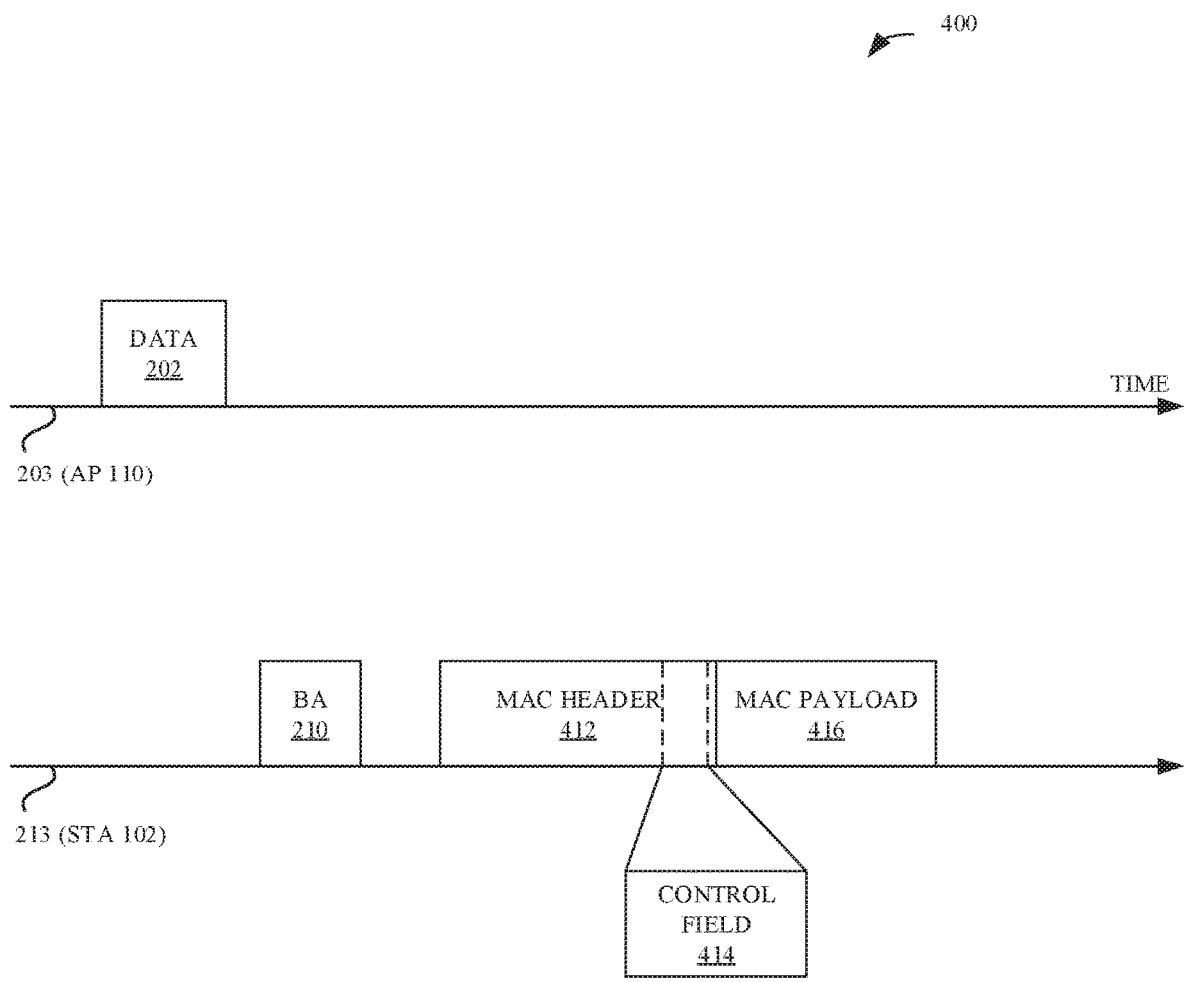
FIG. 4 illustrates an exemplary message sequence in which a STA opportunistically provides a channel estimate in a medium access control (MAC) header, according to some embodiments.
Figure 5:
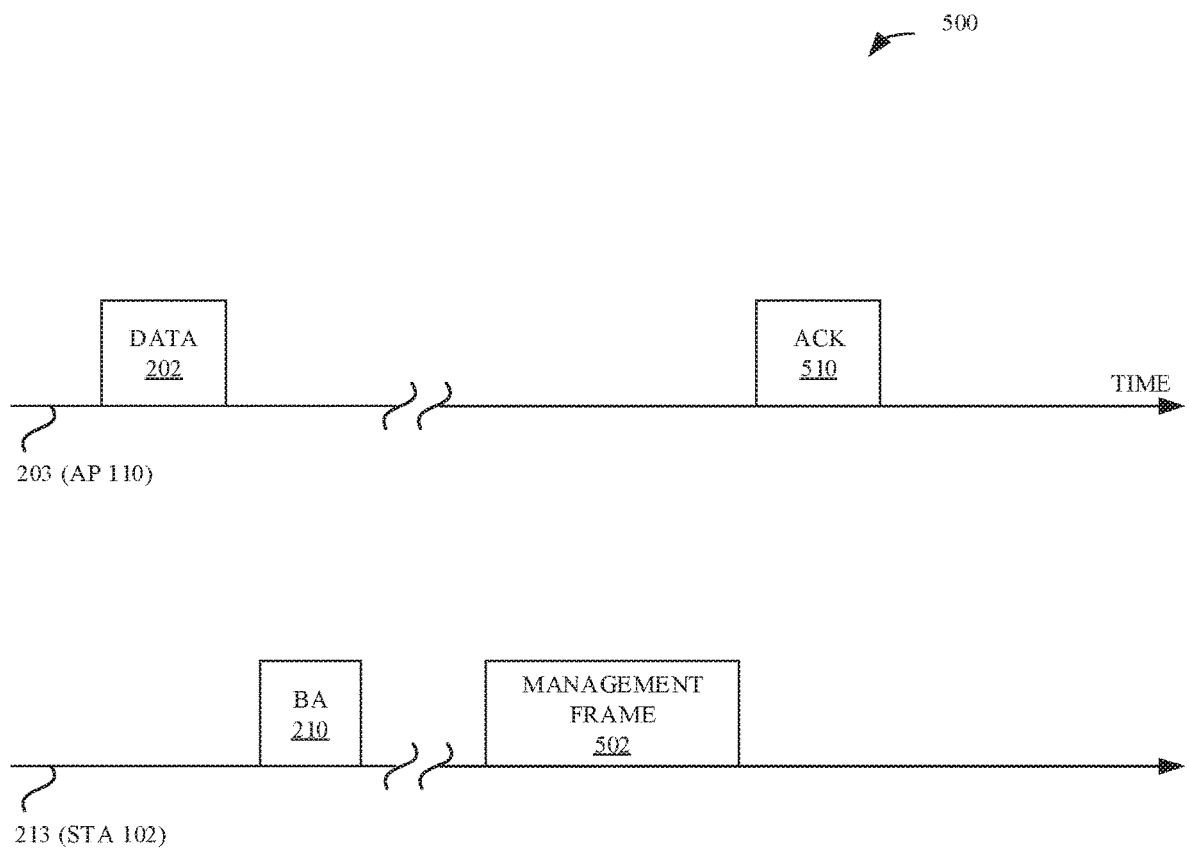
FIG. 5 illustrates an exemplary message sequence in which a STA opportunistically provides a channel estimate in a management frame, according to some embodiments.
Figure 6:
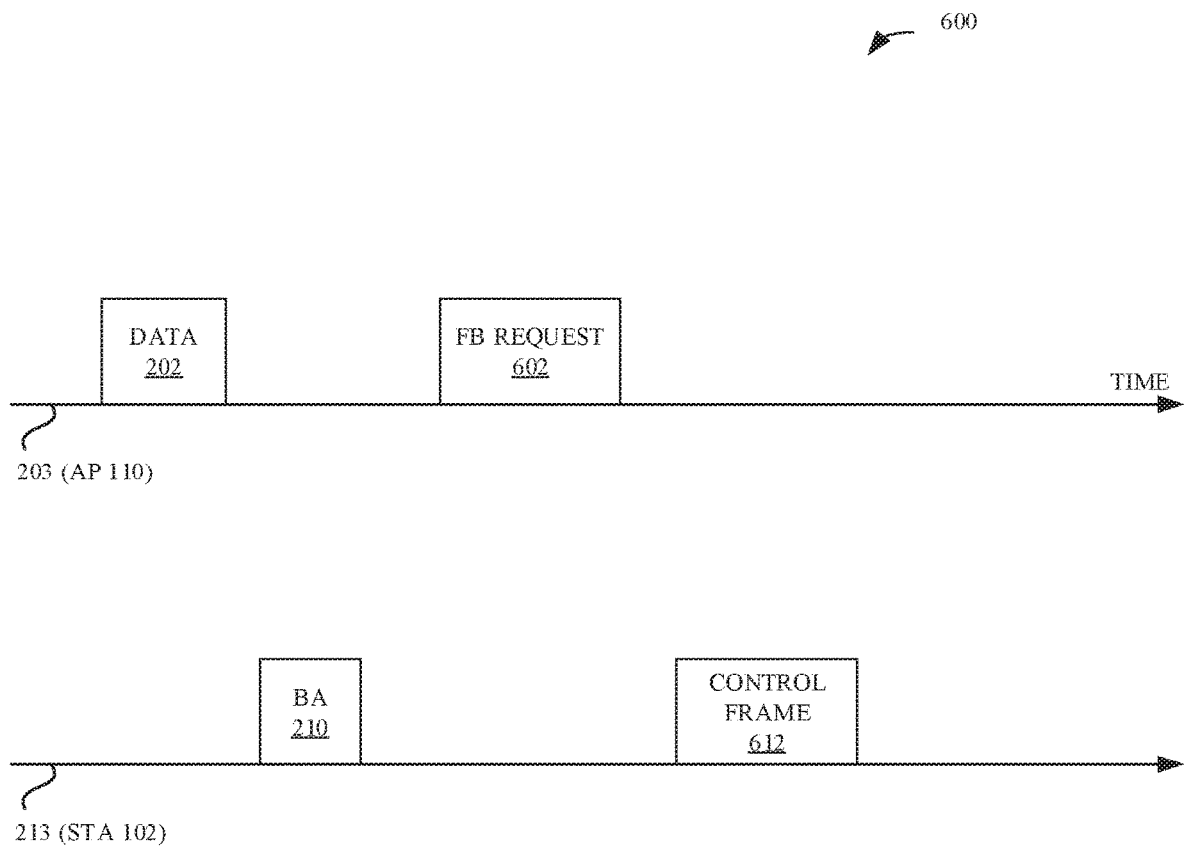
FIG. 6 illustrates an exemplary message sequence in which a STA opportunistically provides a channel estimate in a control frame, according to some embodiments.

FIGS. 4-6 illustrate flexible approaches by which a STA, e.g., STA 102, can provide an encoding of downlink channel information to AP 110.

PPDU, Management Frames and Control Frames

FIG. 4 includes an illustration of an exemplary MAC header embodiment. A transmission by an AP or by a STA can include a PPDU. A MAC PPDU can have a header and a payload. The header can be a MAC header. The payload can be a MAC payload. FIG. 4 illustrates a control field 414 in a MAC header 412. MAC header 412 is followed by MAC payload 416. Control field 414 can include a compressed version of a downlink channel estimate. STA 102 performs a channel estimate based on its observation of data 202. The encoding can be done in a fashion similar to that in FB 212 or FB 220 of FIG. 2. For example, SNR and/or RSSI may be encoded with various levels of quantization. A ranking of RUs may be sent. In some embodiments, opportunistic feedback FB 212 (or FB 220) of FIG. 2 can be or can include a MAC header 412 with a control field 414.

FIG. 5 illustrates an exemplary management frame in which opportunistic feedback FB 212 (or FB 220) of FIG. 2 comprises a management frame 502. A management frame sent by STA 102 (or STA 104), in some embodiments, is not scheduled by AP 110. AP 110 may not know when management frame 502 will be transmitted by STA 102. The time axis 213 in FIG. 5 is shown broken with an indication that STA 102 may perform other activities and some time can pass before transmission of management frame 502. Consequently, the channel may be busy when management frame 502 is sent, and a collision can occur with a transmission from AP 110 or STA 104, for example. The management frame 502 can be sent with an immediate ACK policy. If AP 110 successfully decodes management frame 502 and an immediate ACK policy is indicated in management frame 502, AP 110, in some embodiments, responds with ACK 510. STA 102 receives ACK 510 and then does not re-transmit the encoded channel information of management frame 502. When STA 102 does not receive an ACK after transmission of the management frame, it can retransmit the information of management frame 502. In some embodiments, management frame 502 is sent with a no ACK policy. In that case, AP 110 need not send ACK 510 and STA 102 need not wait for an ACK before continuing with other uplink data to be sent. In some embodiments, AP 110 sends a FB request in a management frame and expects STA 102 to respond with channel information in a management frame.

FIG. 6 illustrates an exemplary channel feedback embodiment in which solicited feedback FB 312 of FIG. 3 comprises a control frame 612. A control frame to be sent by STA 102 is scheduled by AP 110 using FB request 602; that is, FB request 602 can include a control frame sent by AP 110. In some embodiments, FB request 602 polls OFDMA RU quality information from STA 102. AP 110 expects control frame 612 to be transmitted by STA 102 in a limited forthcoming time interval as shown in FIG. 6. In some embodiments, the time interval is a short interframe space (SIFS).

NDP-A Examples

Figure 7:
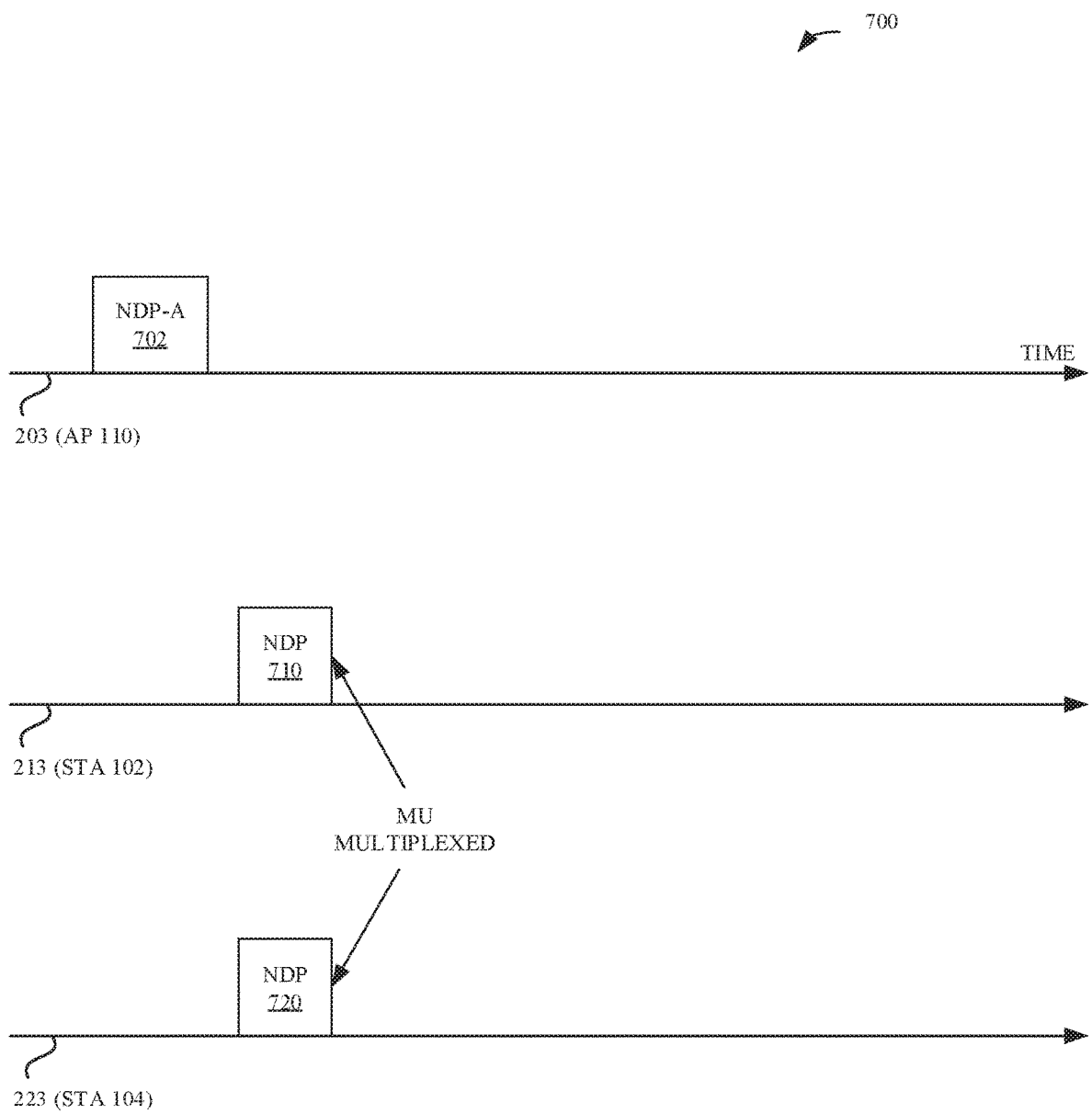
FIG. 7 illustrates an exemplary message sequence in which the AP stimulates transmission of null data packets by STAs in order to initiate explicit uplink channel measurement, according to some embodiments.

FIG. 7 illustrates an exemplary AP-initiated uplink (UL) measurement using a null data packet-announce (NDP-A) message 702. In some embodiments described herein, AP 110 learns the uplink channel response, $H_1$, associated with link 106 by asking STA 102 to send a pilot or sounding or null data packet (NDP) signal on the uplink. AP 110 then samples the NDP arriving from STA 102. Because AP 110 knows the NDP waveform sent by STA 102, it can estimate the channel $H_1$, for example, using a correlation function. With regard to the discussion of FIG. 1, $x_1$ in the FIG. 7 case of pilot transmission is the NDP waveform, and so $x_1$ is known to AP 110 before it is sent by STA 102. In some embodiments, NDP-A 702 instructs STA 102 to energize particular ones of the RUs of the uplink channel frequency band with pilot energy. The location of the energized pilots can be referred to as a map. The instruction of NDP-A 702 includes an OFDMA RU allocation. NDP-A indicates a different OFDMA RU allocation to be used by STA 104. In embodiments, the intersection of pilot energy locations of the resulting NDP 710 map and the resulting NDP 720 map shows no common subcarriers in use at a given OFDM symbol time. Thus NDP 710 and NDP 720 are frequency division multiplexed (see FIGS. 7 and 9) at the RU level in some embodiments. FIG. 7 indicates the transmissions from STA 102 and STA 104 are Multi-User (MU) multiplexed. This MU multiplexing is from the point of view of AP 110. AP 110 estimates the uplink channels $H_1$ and $H_2$ based on a composite received signal (the variable y discussed with respect to FIG. 1). The composite received signal is based on $H_1$, $H_2$, NDP 710 and NDP 720. Subsequently, AP 110 can send a trigger message (not shown), which can include multi-user transmit parameters, and thus AP 110 will schedule the transmission of data by STA 102 and STA 104.

Figure 8:
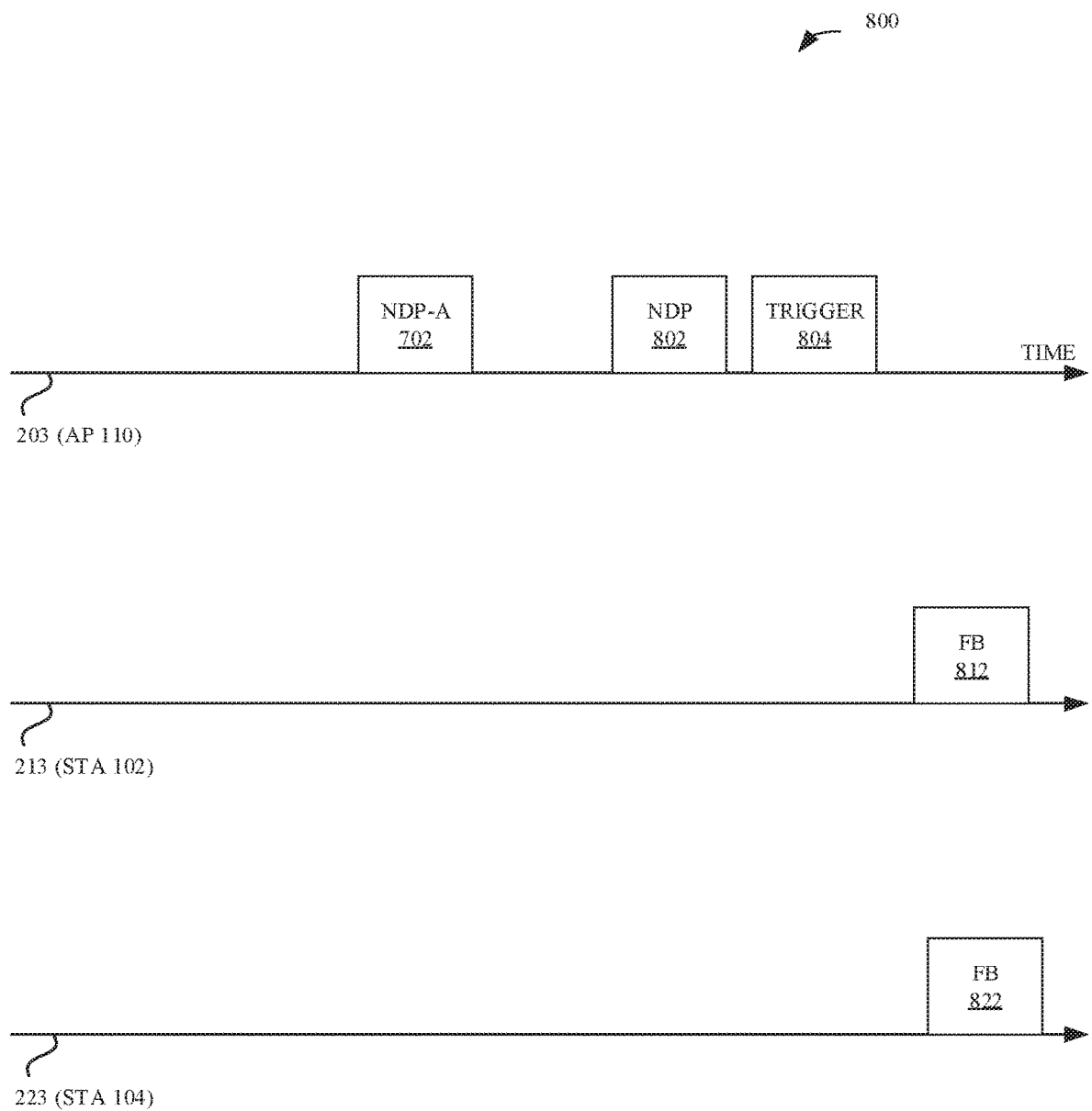
FIG. 8 illustrates an exemplary message sequence in which an AP sends a null data packet and then a trigger frame to collect feedback from STAs, according to some embodiments.

FIG. 8 illustrates an exemplary AP-initiated DL-measurement-based UL estimate using an NDP-A 702, NDP 802 and trigger message 804. In particular, FIG. 8 illustrates an exemplary embodiment to estimate the uplink channels from STA 102 and STA 104 based on first obtaining downlink channel information from STA 102 and STA 104. The uplink channels can be approximated by AP 110 based on the downlink channel estimates using the TDD assumption/ reciprocity as described above. STAs 102 and 104 receive NDP-A 702 and then await NDP 802. STA 102 estimates its downlink channel based on sampling NDP 802 as received at STA 102. STA 104 estimates its downlink channel based on sampling NDP 802 as received at STA 104. AP 110 then transmits trigger 804 addressed to STAs 102 and STA 104. STAs 102 and 104 respond with channel estimate messages FB 812 and FB 822 respectively. AP 110 estimates uplink channels $H_1$ and $H_2$ based on information in FB 812 and FB 822, respectively. The waveform versions of FB 812 and FB 822 received at AP 110 are also generally a function of the uplink channels $H_1$ and $H_2$ since FB 812 travels through at least some subcarriers of $H_1$ and FB 822 travels through at least some subcarriers of $H_2$, in some embodiments.

RU Description and Quality Measures

Figure 9:
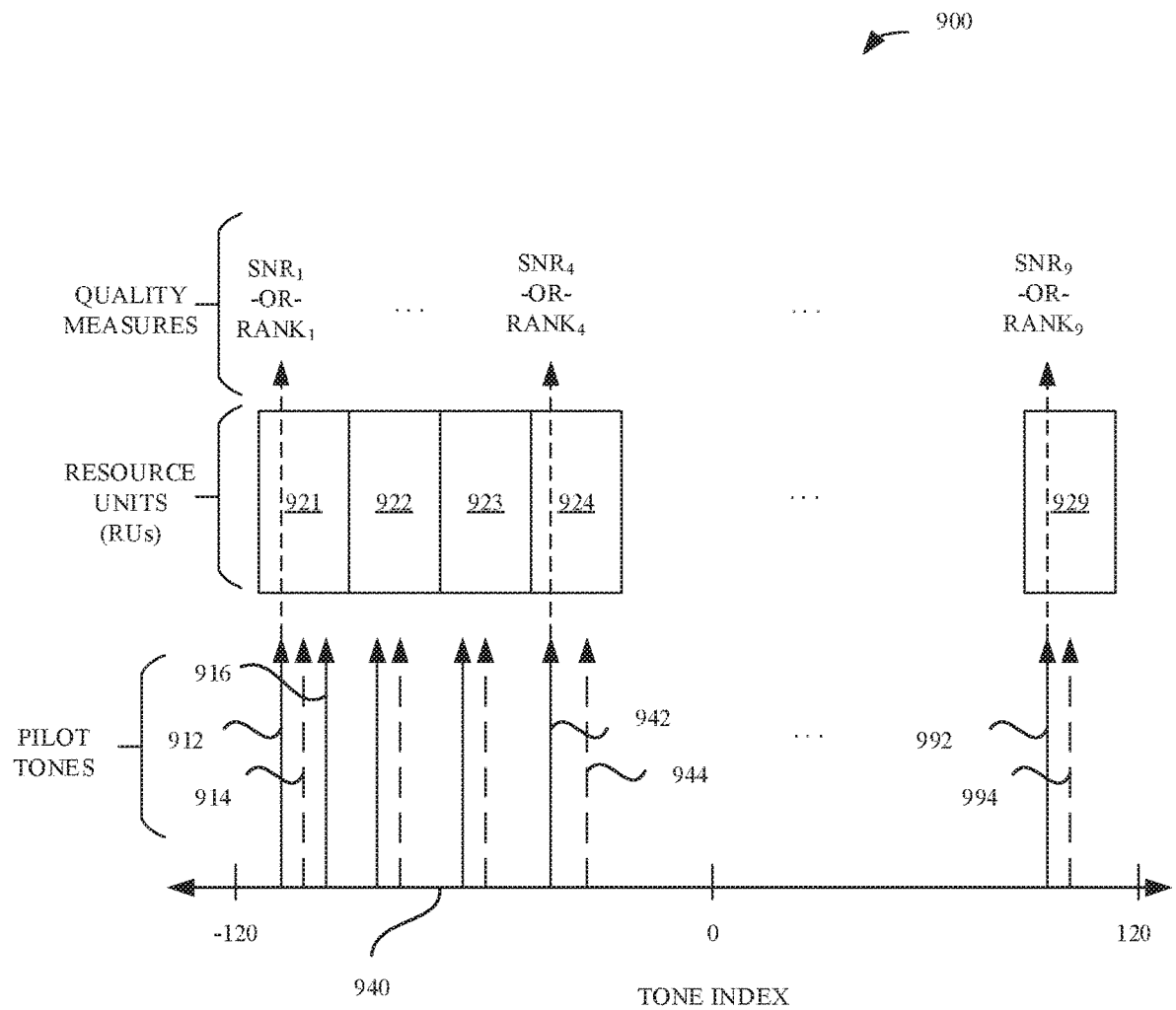
FIG. 9 illustrates exemplary measurements of channel responses at OFDM tone positions corresponding to particular resource units (RUs) in a frequency spectrum, according to some embodiments.

Further description of RUs and channel information is provided in FIG. 9. FIG. 9 illustrates an available system bandwidth of 20 MHz (although other bandwidths can be used in other implementations). Each STA that is provided with an uplink transmission grant is assigned one or more RUs on which to transmit. The duration of the subsequent data transmission from a STA, in some instances, will be for one PPDU, that is, one packet interval. An example downlink PPDU is data 202. An RU, in some embodiments, represents 26 contiguous tones or subcarriers (although other arrangements of tones or subcarriers can be used). For example, STA 102 of FIG. 1 may be provided with an allocation representing each of RU 921, 922, . . . , 929, that is, the entire 20 MHz band. In some embodiments, STA 102 is provided RU 921, a STA 103 (not shown) is provided RU 922 and STA 104 of FIG. 1 is provided RU 929. In some embodiments, STA 102 is provided with RU 921 and STA 104 is provided with RU 922 and RU 924. The allocations of one or more RUs to a particular STA need not be contiguous in frequency.

FIG. 9 illustrates allocations 921 . . . 929 representing nine twenty-six-tone RUs in a 20 MHz system bandwidth. In order to learn which RUs to assign to which STAs, the AP can collect information using one or more of the implementations described above with regard to FIGS. 2-8. FIG. 9 illustrates that STA 102 may observe tones 912, . . . , 914, . . . , and 992 and produce exemplary quality measures indicated as $SNR_1, \ldots, SNR_9$ or $rank_1, \ldots, rank_9$. These quality measures are reported, for example, as encodings described with regard to feedback message FB 212, FB 220, FB 312, FB 812 or, for example, FB 822 described above. The transmission of the encoded information can be performed according to the frame types discussed with respect to one or more of FIGS. 4-6 and FIG. 8. In some embodiments, one report contains quality values for multiple RUs and these RUs can be based on certain criteria, for example the top three RUs that have the best SNR values. In some embodiments, the RU allocations 921 . . . 929 (shown in FIG. 9) have values assigned to the variables $rank_1, \ldots, rank_9$. For example (see Table 1), these 9 rank values ($rank_1, \ldots, rank_9$) may have example ranks of {5, 2, 9, 6, 4, 8, 1, 3, 7} where 1 indicates the highest SNR out of the set $SNR_1, \ldots, SNR_9$ and 9 represents the lowest (noisiest) SNR out of the set. If the top 3 SNR values are to be sent, then, in this example, $SNR_7$ (strongest), $SNR_2$ (second strongest), and $SNR_8$ (third strongest) will be sent in the report.

TABLE 1

Rank Example

| RU Index | Rank | SNR Value |
|---|---|---|
| 921 | 5 | $SNR_1$ |
| 922 | 2 | $SNR_2$ |
| 923 | 9 | $SNR_3$ |
| 924 | 6 | $SNR_4$ |
| 925 | 4 | $SNR_5$ |
| 926 | 8 | $SNR_6$ |
| 927 | 1 | $SNR_7$ |
| 928 | 3 | $SNR_8$ |
| 929 | 7 | $SNR_9$ |

The reporting message, in some embodiments, includes indications of the top-ranked RU indices without sending indications of the corresponding SNR values. In the example of Table, in some embodiments, the reporting message would thus indicate indices 927, 922, and 928 without reporting $SNR_7$, $SNR_2$ or $SNR_8$.

In other embodiments, a system bandwidth of 40 MHz is available for uplink transmission—corresponding to eighteen twenty-six-tone RUs. In a 40 MHz bandwidth, the AP can request that up to eighteen STAs respond with NDPs in order that the AP may determine up to 18 allocations.

Figure 10:
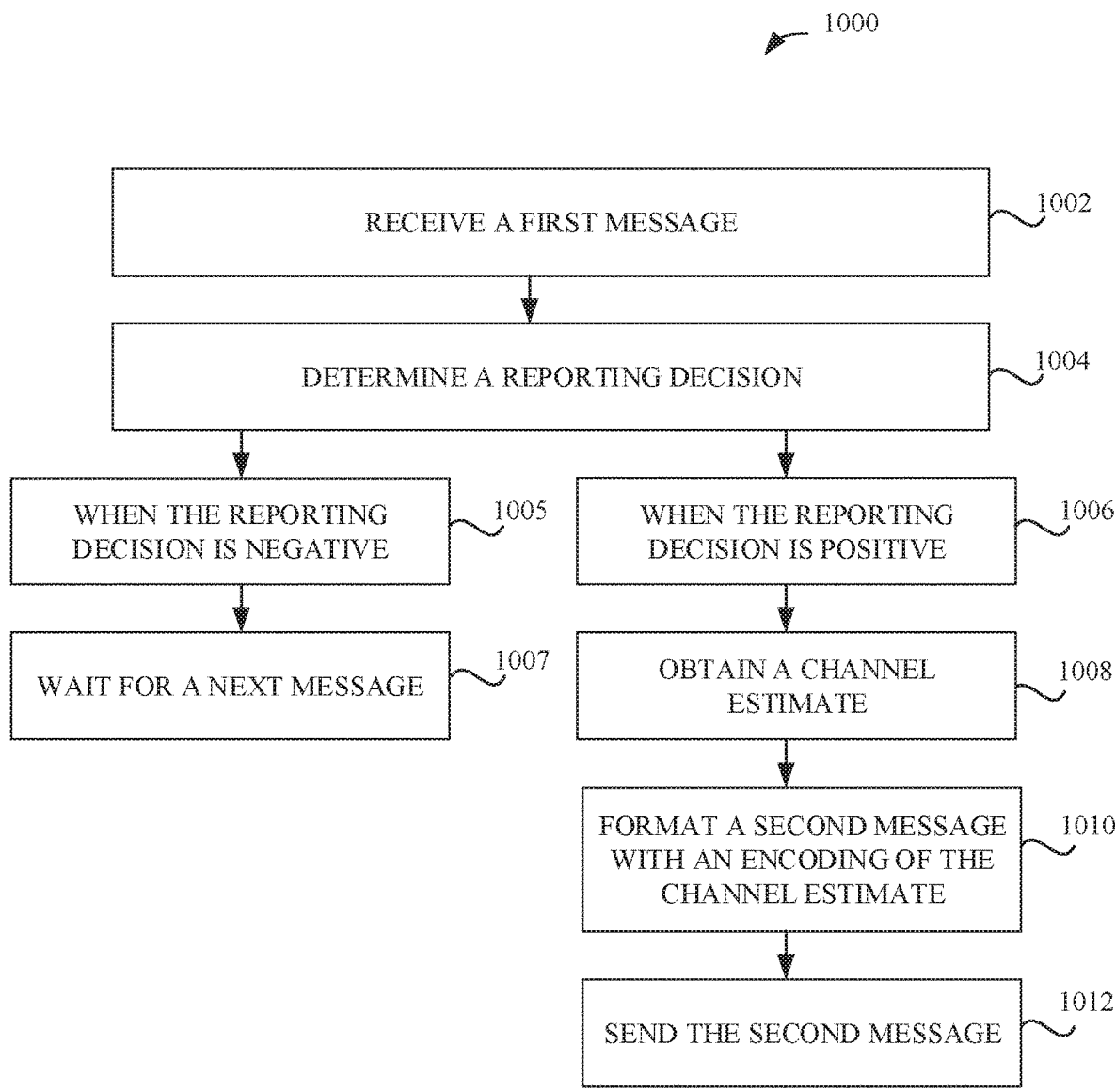
FIG. 10 illustrates an exemplary logic flow for a first STA, according to some embodiments.

FIG. 10 illustrates an exemplary logic flow realized in some embodiments by a wireless device. At 1002, the wireless device receives a first message from a base station. At 1004, the wireless device determines a reporting decision. The wireless device can favor a reporting decision if: i) a buffer status in the wireless device indicates a buffer has data to be sent or is about to overflow, ii) an estimate of a geographic mobility of the first device indicates that the uplink channel is changing rapidly and a base station should be updated, iii) in response to a feedback control field received from the base station, iv) a measure of overall network activity in uplink and downlink by the wireless device, and/or v) an estimate of arrival rate of received data at the wireless device. In some embodiments, the overall network activity is a cumulative value including a sum of the uplink activity (in terms of transmitted packet rate) and downlink activity (in terms of received packet rate).

When the reporting decision is negative, indicated by 1005, the wireless device waits for a next message at 1007. When the reporting decision is positive, indicated by 1006, the wireless device obtains a channel estimate at 1008; in some embodiments this could be an SNR value, ranking value, RU index, and/or RSSI value. The channel estimate could be in memory, or it could be computed by the STA based on a message, such as the first message. At 1010, the wireless device formats a second message with an encoding of the channel estimate. At 1012, the wireless device sends the second message to the base station. A STA is an example of a wireless device and an AP is an example of a base station.

Figure 11:
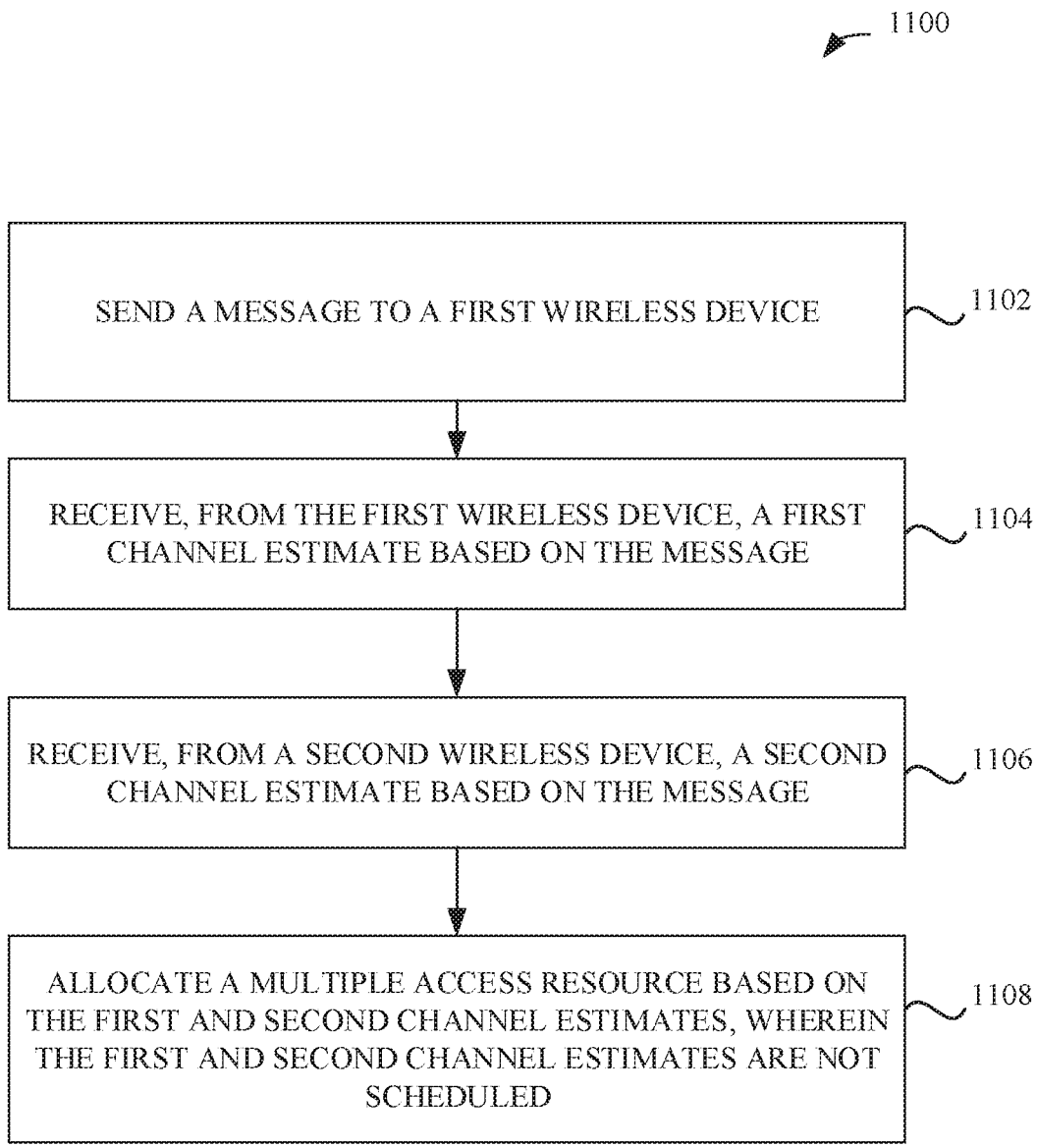
FIG. 11 illustrates an exemplary logic flow for an AP, according to some embodiments.

FIG. 11 illustrates an exemplary logic flow realized in some embodiments by a base station. At 1102, the base station sends a message to a first wireless device. At 1104, the base station receives a first channel estimate (e.g., an SNR value, ranking value, RU index, and/or RSSI value) based on the message. At 1106, the base station receives a second channel estimate (e.g., an SNR value, ranking value, RU index, and/or RSSI value) based on the message. At 1108, the base station allocates a multiple access resource, for example, an OFDMA RU, to the first wireless device or to the second wireless device. 1108 also indicates that transmissions of the first and second channel estimates by the first and second wireless devices, respectively, were not scheduled by the base station. A STA is an example of a wireless device and an AP is an example of a base station.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

IEEE 802.11ac is an example of a system using Orthogonal Frequency Division Multiplexing (OFDM) to modulate data onto OFDM symbols. OFDM is a modulation scheme which uses many narrowband subcarriers to overcome delay spread yet provide high bandwidth. A modulation feature of an OFDM symbol known as a cyclic prefix reduces the need or complexity of equalization of multipath effects at a receiver in many scenarios. The distribution of subcarriers within a single OFDM symbol among more than one user is known as Orthogonal Frequency Division Multiple Access (OFDMA). A collection of subcarriers within an OFDM symbol can be referred to as a resource unit (RU). In an OFDMA frame structure, each subcarrier is modulated with a number of OFDM symbols. On a given subcarrier during a given frame, some RUs may be devoted to pilot energy and other RUs may be provided with no pilot energy. The collection of RUs over all the subcarriers is represented by a time/subcarrier map. A null data packet (NDP) comprises pilot tones useful for channel estimation.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 12:
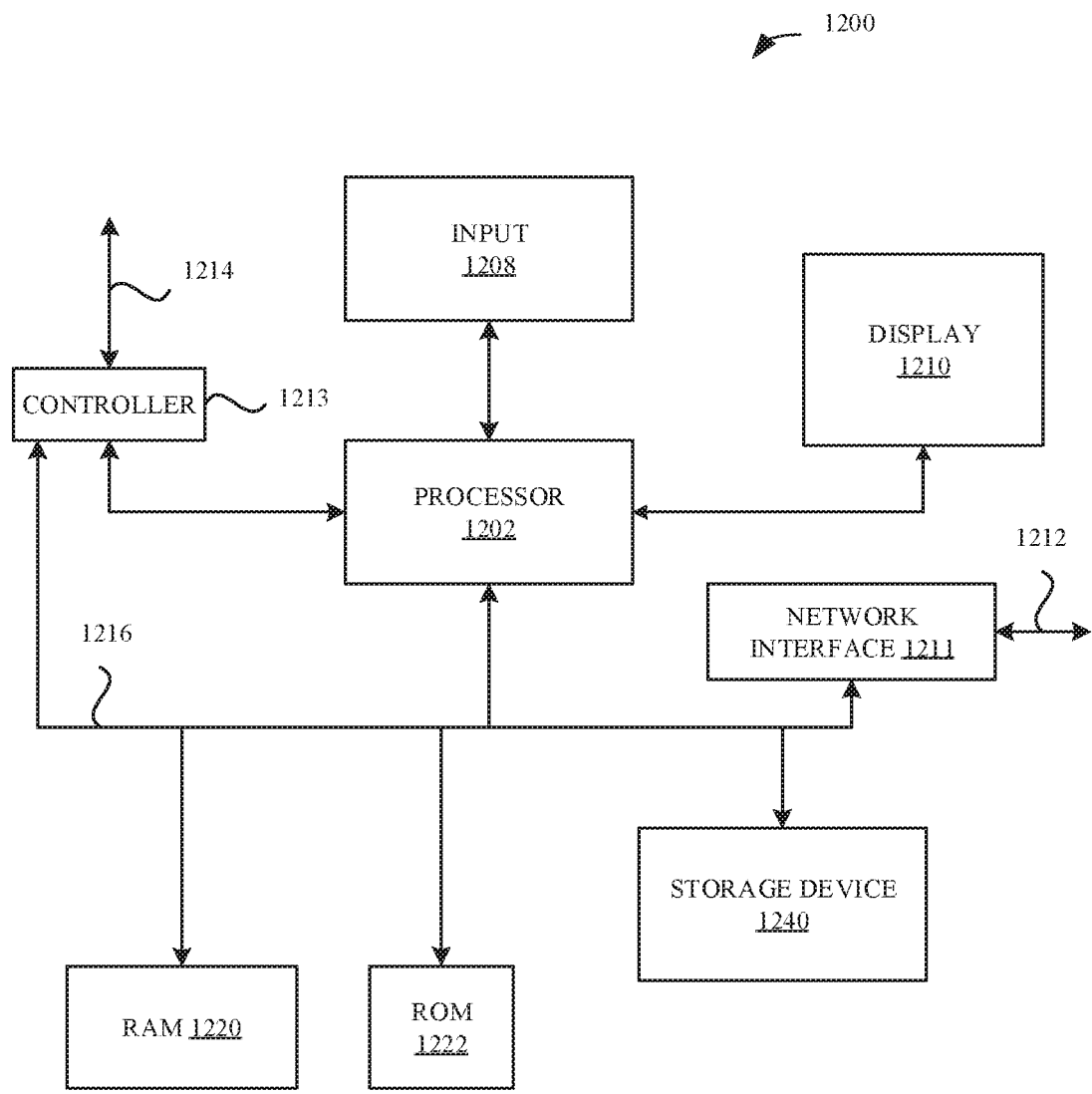
FIG. 12 illustrates an exemplary apparatus for implementation of embodiments disclosed herein.

FIG. 12 illustrates in block diagram format an exemplary computing device 1200 that can be used to implement the various components and techniques described herein, according to some embodiments. In particular, the detailed view of the exemplary computing device 800 illustrates various components that can be included in STA 102, STA 104 or AP 110 illustrated in FIG. 1. As shown in FIG. 12, the computing device 1200 can include a processor 1202 that represents a microprocessor or controller for controlling the overall operation of computing device 1200. The computing device 1200 can also include a user input device 1208 that allows a user of the computing device 1200 to interact with the computing device 1200. For example, the user input device 1208 can take a variety of forms, such as a button, keypad, dial, touch screen, audio input interface, visual/image capture input interface, input in the form of sensor data, etc. Still further, the computing device 1200 can include a display 1210 (screen display) that can be controlled by the processor 1202 to display information to the user (for example, information relating to incoming, outgoing, or active communication session). A data bus 1216 can facilitate data transfer between at least a storage device 1240, the processor 1202, and a controller 1213. The controller 1213 can be used to interface with and control different equipment through an equipment control bus 1214. The computing device 1200 can also include a network/bus interface 1211 that couples to a data link 1212. In the case of a wireless connection, the network/bus interface 1211 can include wireless circuitry, such as a wireless transceiver and/or baseband processor.

The computing device 1200 also includes a storage device 1240, which can comprise a single storage or a plurality of storages (e.g., hard drives), and includes a storage management module that manages one or more partitions within the storage device 1240. In some embodiments, storage device 1240 can include flash memory, semiconductor (solid state) memory or the like. The computing device 1200 can also include a Random Access Memory ("RAM") 1220 and a Read-Only Memory ("ROM") 1222. The ROM 1222 can store programs, utilities or processes to be executed in a non-volatile manner. The RAM 1220 can provide volatile data storage, and stores instructions related to the operation of the computing device 1200.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
by a wireless device:
receiving a downlink data message from a second wireless device;
determining opportunistically to send an unsolicited report of a channel estimate for use in the second wireless device to use for subsequent resource allocation for uplink communication from the wireless device to the second wireless device;
determining the channel estimate based on the downlink data message;
formatting an uplink message with an encoded value, wherein the encoded value is based on the channel estimate; and
sending the uplink message to the second wireless device, wherein:
the downlink data message comprises a media access control (MAC) data frame including i) a header addressed to a third wireless device and not addressed to the wireless device, and ii) a random data payload for the third wireless device, and the channel estimate is based at least on i) a known pattern in a preamble of the downlink data message, or ii) data-value-insensitive measurements.

2. The method of claim 1, further comprising:
determining a first set of quality measures, each quality measure of the first set corresponding to a resource unit (RU) of a second set of RUs;
ranking the first set, to form a third set of rank values;
choosing, based on the third set, a subset of the first set, wherein: i) the subset has the highest quality measure values among the first set, and ii) the subset comprises an indication of RU indices for fewer RUs than in the second set of RUs; and
including a quality indication in the uplink message, wherein: i) the quality indication includes the encoded value, and ii) the encoded value corresponds to an encoding of one or more of the RU indices in the subset,
wherein each RU corresponds to a set of one or more subcarriers.

3. The method of claim 1, wherein the determining opportunistically to send an unsolicited report of a channel estimate is performed based on one or more of:
i) a buffer status in the wireless device,
ii) an estimate of a geographic mobility of the wireless device,
iii) an estimate of a cumulative network activity of the wireless device, and/or
iv) an estimate of an arrival rate of received downlink data at the wireless device.

4. The method of claim 1, wherein the encoded value represents a channel quality of one or more resource units (RUs), the channel quality corresponding to a signal to noise ratio (SNR) or a ranking.

5. The method of claim 1, wherein the encoded value represents a received signal strength indication (RSSI) computed over a system bandwidth.

6. The method of claim 1, wherein the wireless device and the second wireless device comply with an Institute of Electronic and Electrical Engineering (IEEE) Wireless Local Area Network (LAN) standard.

7. The method of claim 6, wherein the uplink message comprises a Medium Access Control (MAC) header that includes the encoded value.

8. The method of claim 7, wherein the uplink message further comprises a MAC uplink data payload.

9. The method of claim 8, wherein the uplink message comprises a management frame, the management frame comprises a MAC header, and the MAC header comprises the encoded value.

10. The method of claim 9, wherein the uplink message indicates an immediate acknowledgement (ACK) policy.

11. The method of claim 6, wherein the uplink message comprises a control frame that includes the encoded value.

12. A wireless device comprising:
a transceiver;
a memory; and
a processor, wherein the memory comprises instructions that when executed by the processor cause the wireless device to perform steps comprising:
receiving, via the transceiver, a downlink data message from a second wireless device;
determining opportunistically to send an unsolicited report of a channel estimate for use in the second wireless device to use for subsequent resource allocation for uplink communication from the wireless device to the second wireless device;

determining the channel estimate based on the downlink data message;
formatting an uplink message with an encoded value, wherein the encoded value is based on the channel estimate; and
sending, via the transceiver, the uplink message to the second wireless device,
wherein:
the downlink data message comprises a media access control (MAC) data frame including i) a header addressed to a third wireless device and not addressed to the wireless device, and ii) a random data payload for the third wireless device, and
the channel estimate is based at least on i) a known pattern in a preamble of the downlink data message, or ii) data-value-insensitive measurements.

13. The wireless device of claim 12, wherein the determining opportunistically to send an unsolicited report of a channel estimate depends on one or more of:
i) a buffer status in the wireless device,
ii) an estimate of a geographic mobility of the wireless device,
iii) an estimate of a cumulative network activity of the wireless device, and/or
iv) an estimate of an arrival rate of received downlink data at the wireless device.

14. The wireless device of claim 13, wherein:
the determining opportunistically to send the unsolicited report of the channel estimate depends on the estimate of the cumulative network activity of the wireless device, and
the cumulative network activity is a sum of a received packet rate and a transmitted packet rate.

15. The wireless device of claim 12, wherein the steps further comprise:
determining a first set of quality measures, each quality measure of the first set corresponding to a resource unit (RU) of a second set of RUs;
ranking the first set, to form a third set of rank values;
choosing, based on the third set, a subset of the first set, wherein: i) the subset has the highest quality measure values among the first set and ii) the subset comprises an indication of RU indices for fewer RUs than in the second set of RUs; and
including a quality indication in the second uplink message, wherein: i) the quality indication includes the encoded value, and ii) the encoded value corresponds to an encoding of one or more of the RU indices in the subset,
wherein each RU corresponds to a set of one or more subcarriers.

16. A non-transitory computer-readable storage medium storing instructions that, when executed on a processor of a wireless device, cause the wireless device to perform steps comprising:
receiving a downlink data message from a second wireless device;
determining opportunistically to send an unsolicited report of a channel estimate for use in the second wireless device to use for subsequent resource allocation for uplink communication from the wireless device to the second wireless device;
determining the channel estimate based on the downlink data message;
formatting an uplink message with an encoded value, wherein the encoded value is based on the channel estimate; and
sending the second uplink message to the second wireless device,
wherein:
the downlink data message comprises a media access control (MAC) data frame including i) a header addressed to a third wireless device and not addressed to the wireless device, and ii) a random data payload for the third wireless device, and
the channel estimate is based at least on i) a known pattern in a preamble of the downlink data message, or ii) data-value-insensitive measurements.

17. The non-transitory computer-readable storage medium of claim 16, wherein the steps further comprise:
determining a first set of quality measures, each quality measure of the first set corresponding to a resource unit (RU) of a second set of RUs;
ranking the first set, to form a third set of rank values;
choosing, based on the third set, a subset of the first set, wherein: i) the subset has the highest quality measure values among the first set, and ii) the subset comprises an indication of RU indices for fewer RUs than in the second set of RUs; and
including a quality indication in the uplink message, wherein: i) the quality indication includes the encoded value, and ii) the encoded value corresponds to an encoding of one or more of the RU indices in the subset,
wherein each RU corresponds to a set of one or more subcarriers.

18. The non-transitory computer-readable storage medium of claim 16, wherein the determining opportunistically to send an unsolicited report of a channel estimate is performed based on one or more of:
i) a buffer status in the wireless device,
ii) an estimate of a geographic mobility of the wireless device,
iii) an estimate of a cumulative network activity of the wireless device, and/or
iv) an estimate of an arrival rate of received downlink data at the wireless device.

* * * * *

UNITED STATES PATENT AND TRADEMARK OFFICE
CERTIFICATE OF CORRECTION

PATENT NO. : 10,778,472 B2
APPLICATION NO. : 15/371049
DATED : September 15, 2020
INVENTOR(S) : Li et al.

Page 1 of 1

It is certified that error appears in the above-identified patent and that said Letters Patent is hereby corrected as shown below:

In the Claims

In Claim 16, at Column 16, Line 13: "sending the second uplink message" should read -- sending the uplink message --.

Signed and Sealed this
Seventeenth Day of November, 2020

Andrei Iancu
*Director of the United States Patent and Trademark Office*